United States Patent [19]
Klement

[11] 3,758,876
[45] Sept. 11, 1973

[54] CARBON DIOXIDE LASER
[75] Inventor: Ekkehard Klement, Munich, Germany
[73] Assignee: Siemens Aktiengesellschaft, Berlin & Munich, Germany
[22] Filed: July 26, 1971
[21] Appl. No.: 165,960

[30] Foreign Application Priority Data
Aug. 4, 1970 Germany................... P 20 38 777.3

[52] U.S. Cl.................. 331/94.5, 313/217, 313/218
[51] Int. Cl............................................... H01s 3/00
[58] Field of Search..................... 313/211, 212, 217, 313/218, 310, 311, 313, 340, 346, 355, 356; 331/94.5 C, 94.5 D, 94.5 P, 94.5 E, 94.5 G

[56] References Cited
UNITED STATES PATENTS
2,657,325 11/1953 Homer et al......................... 313/212
3,227,911 1/1966 Heil .................................... 313/340

Primary Examiner—Ronald L. Wibert
Attorney—Carlton Hill, J. Arthur Gross and John D. Simpson et al.

[57] ABSTRACT

A carbon dioxide laser having an oxygen-providing agent incorporated therein comprised of a nickel oxide member arranged in the laser tube in association with a heater so that the nickel oxide reaches temperatures of about 400° to 500° C. during operation. A preferred form of nickel oxide member comprises an oxidized surface layer on a nickel metal base positioned in close proximity to an electrode and outside the discharge. In one form the cathode is formed of nickel and the outer surface thereof is oxidized to form the oxygen-providing agent. In another form a metallic mesh-like nickel screen is oxidized so that the outer surface thereof comprises nickel oxide and is positioned in close proximity to the cathode. Auxiliary heating means are provided in certain embodiments to attain a desired operating temperature.

11 Claims, 3 Drawing Figures

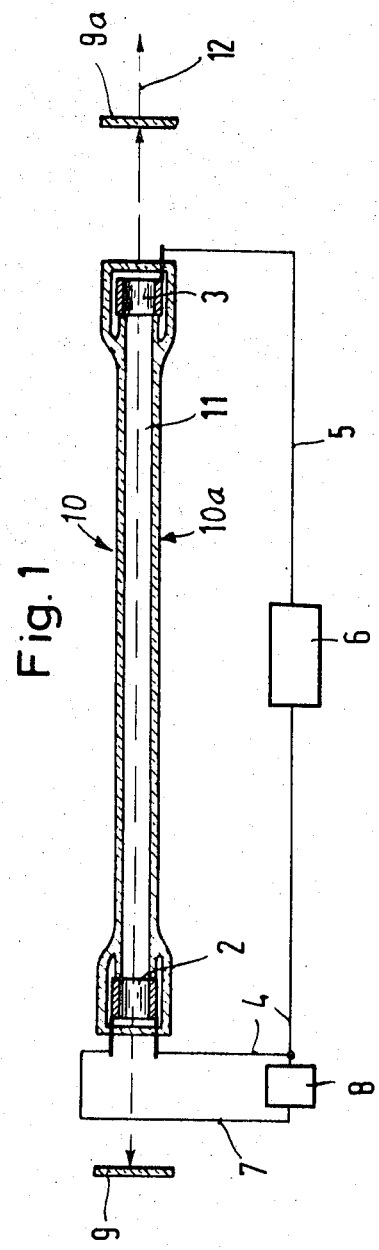
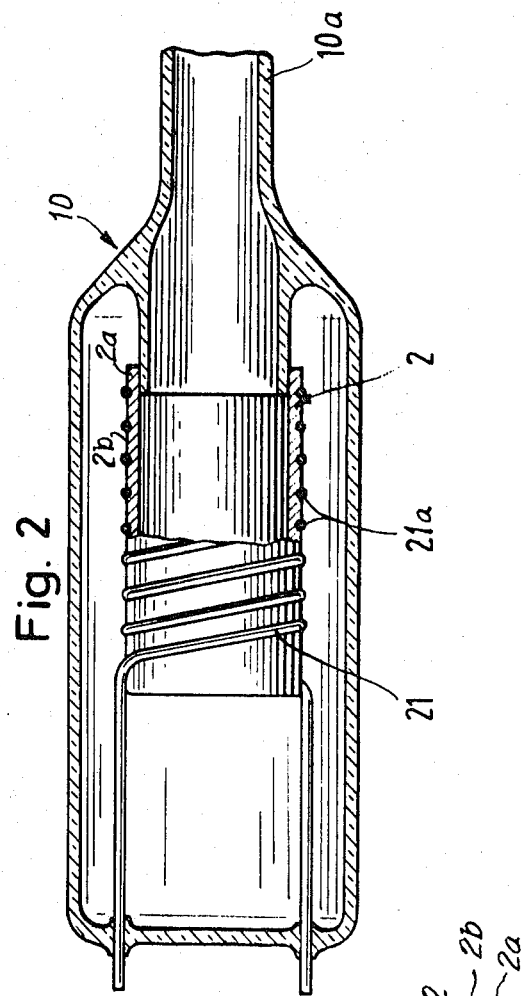
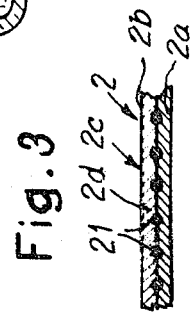
INVENTOR
Ekkehard Klement

CARBON DIOXIDE LASER

BACKGROUND OF THE INVENTION

1. Field Of The Invention

This invention relates to closed carbon-dioxide lasers and more particularly to closed carbon-dioxide lasers having oxygen provided to its discharge tube.

2. Prior Art

It is well known that $CO_2$ dissociates under the influence of gas discharge in accordance with the equation: $CO_2 \rightleftarrows CO + \frac{1}{2} O_2$. The equilibrium pressure of CO is therefore much higher than would be expected from the thermic considerations. However, due to the known oxygen consumption in gas discharges, the equilibrium is not stable and $CO_2$ is consumed. Necessarily, the useful life of a closed discharge tube laser is limited.

In order to avoid this drawback, it has been proposed to insert a means into the discharge tube of $CO_2$ lasers which supplies oxygen during laser operation. This is cumbersome and unsatisfactory. The equilibrium of gas dissociation can also be shifted in fabor of the $CO_2$ by providing catalyzers that promote the oxidation of CO into $CO_2$. Heated nickel is a known catalyzer for this application but CO is an active nickel catalyst poison so that obvious disadvantages result.

SUMMARY OF THE INVENTION

The invention provides a long-life carbon-dioxide laser including a closed discharge tube having an oxygen-providing agent enclosed within the tube in working association with a heating means that maintains the oxygen-providing agent at a temperature of at least 400° C. during operation of the laser. The oxygen-providing agent comprises nickel oxide, as in the form of an outer layer on a supporting base. Preferably the nickel oxide layer is of a thickness of at least 1 millimicron ($\mu$m) and ranges up to several millimicrons. In one preferred embodiment, an electrode (i.e. a base) of the laser is composed of nickel and coated with an outer layer of the oxygen-providing agent, nickel oxide. In another preferred embodiment, a metal base in the form of a mesh or gauze is provided with an outer layer of nickel oxide and is positioned in close proximity to an electrode outside the discharge influence thereof. Auxiliary heating means are provided with certain forms to attain the desired temperatures. In specifically preferred forms of the invention, the electrode associated with the oxygen-providing agent is the cathode electrode.

BRIEF DESCRIPTION OF THE DRAWINGS

FIG. 1 is an elevational side view of a carbon dioxide laser shown in section, schematically associated with a working invironment and incorporating the principles of the invention therein;

FIG. 2 is a partial enlarged view of an embodiment of the invention; and

FIG. 3 is a partial view somewhat similar to FIG. 2, illustrating another embodiment of thhe invention.

DESCRIPTION OF THE PREFERRED EMBODIMENTS

The invention provides a closed carbon-dioxide laser having an oxygen-providing agent operationally associated therewith, which materially increases the useful life of the laser. The oxygen-providing agent functions as a catalyzer in promoting the oxidation of CO into $CO_2$ and does not have any interfering side effects in a gas laser.

The oxygen-providing agent comprises nickel oxide arranged within the discharge tube of a carbon-dioxide gas laser in a manner so as to reach a temperature of at least 400° C. during operation of the laser. Preferably, the temperature of the oxygen-providing agent remains in the range of 400° to 500° C. during operation. An additional heating means is provided in certain embodiments to maintain the desired operational temperatures, particularly by heating the nickel oxide agent. The nickel oxide preferably is in the form of an outer layer of a desired thickness on a suitable supporting base.

In one preferred embodiment, the supporting base is a nickel electrode having an outer layer of nickel oxide. In such an embodiment, the electrode functions as a heating means and provides a desired high temperature during operation of a laser. Additional heating means are, optionally, provided to insure that the desired temperatures are achieved.

Preferably, the cathode of the laser is the electrode composed of nickel, since this dissociation of $CO_2$ in the area of close proximity to the cathode fall is more pronounced than in other areas of the discharge tube. Also, the concentration of CO in the area surrounding the cathode is increased due to electrophoresis.

In another preferred embodiment, the oxygen-providing agent (nickel oxide) is the outer layer on a mesh-like or gauze-like base. This form of base provides an expanded outer surface area thereby allowing the inclusion of a maximum amount of nickel oxide thereon. The base is preferably composed of nickel, which for example is subjected to oxidizing conditions sufficient to produce a realtively thick, i.e. several millimicrons, outer layer of nickel oxide. The coated mesh-like member is preferably positioned in close working proximity to one of the electrodes, as for example a more or less loose winding or the like surrounding the cathode. In this manner the mesh-like member is capable of withstanding the relatively high operating temperatures. Of course, care must be taken to insure that the coated mesh-like member does not become an electrode since the relatively thin thread-like elements thereof would be atomized or scattered in too great a degree. An auxiliary heating means, such as an electrical heating coil, is preferably associated with the coated mesh-like member to heat it to the desired operational temperature.

The invention is of primary (but not sole) importance to closed carbon dioxide lasers since the nickel oxide (i.e. the oxygen-providing material) insures a relatively constant gas composition mixture in the discharge tube over elongated periods of time thereby providing a long life closed carbon-dioxide laser.

Preferably, the nickel oxide layer is produced in a thickness of at least 1 $\mu$m and generally of several $\mu$m on a metal base. For example, a nickel base in the form of an electrode is subjected to oxidation conditions sufficient to produce a uniform outer layer of nickel oxide. The long stabilizing effects on a gas laser provided by the invention is to a certain extent, governed by the sufficiency of the availble surface of the oxygen-providing agent.

A conventional gas by-pass can be incorporated between the anode and cathode electrodes to provide gas circulation by electrophoresis.

Referring now to the drawings wherein like reference numerals designate like parts, a closed carbon dioxide laser 10 is illustrated as having a glass envelope or tube 10a having a carbon dioxide gas composition capable of producing laser radiation upon electric discharge suitably sealed therein. Electrodes are provided within the envelope 10a and facing one another for electrical discharge therebetween, as a cathode 2 and an anode 3 for the production of the discharge in the carbon dioxide gas. As shown, the electrodes 2 and 3 are operationally connected to a voltage source 6 by an electric conduit 4 and 5 and thus include means for connection with a voltage source whereby one functions as a cathode and the other functions as an anode. In the embodiment illustrated, an additional voltage source 8 is also operationally connected to the cathode 2 by conduits 7 and 4 to function as a heating means for the cathode by providing additional electrical energy.

Suitable mirrors 9 and 9a respectively are positioned in working relation to the laser 10 and particularly to the path of laser radiation, schematically illustrated by the dotted line 11. As shown, mirror 9a is partially permeable to the laser radiation and the portion thereof passing through the mirror 9a is designated 12. Appropriate switches, controls, etc. are also provided so that an operational or working environment for a laser is present.

FIG. 2 illustrates a portion of the laser 10 and shows the cathode 2 as comprised of a base metal electrode 2a, preferably of nickel, uniformly coated with an outer layer 2b of the oxygen-providing meterial of the invention, i.e. nickel oxide. In the embodiment shown, an auxiliary heating means 21, comprised of wound electrically insulated wire 21a or the like, is provided on the outer surface of the cathode 2. In certain embodiments, grooves or the like are provided on the outer (cylindrical) surface of the cathode 2 to aid in maintaining the wire 21a in proper relation thereon.

In the embodiment partially illustrated at FIG. 3, the metal electrode 2a is provided with an auxiliary heating means 21 as discussed earlier. Superimposed thereon is a mesh-like base, schematically illustrated as 2c, preferably composed of nickel, having its outer surface oxidized into an outer layer 2b of nickel oxide so as to form an oxidized mesh-like member 2d. The oxidized mesh-like member 2d is positioned in close proximity to the electrode element 2a of the cathode 2. For example, the oxidized mesh-like member 2d is loosely wound onto the outer surface of the electrode element 2a, as in the form of a bandage. Since the oxidized mesh-like member 2d is outside the periphery (i.e. cylindrical surface) of the electrode element t2a, it is screened from electric discharge and not included within the discharge. Positioning the member 2d outside the discharge prevents destruction thereof. Of course, heating means 21 is in working contact with the member 2d and during operation heats member 2d to the desired operating temperature allowing efficient function thereof as described.

Discussion of the embodiments illustrated at FIGS. 2 and 3 focused on the cathode, however, the invention includes similar anode constructions.

The drawings and specifications present a detailed disclosure of the preferred embodiments mentioned and it is to be understood that the invention is not limited to the specific forms disclosed. For example, the heating means 21 can be eliminated from the embodiment illustrated at FIG. 2 in instances where the cathode electrode attains the desired temperatures during operation. Further, the embodiment of FIG. 3 can be modified so that the heating means 21 contacts only the oxidized mesh-like member 2d. Accordingly, it will be understood that modifications and variations may be effected without departing from the spirit and scope of the novel concepts of the present invention.

I claim as my invention:

1. A carbon-dioxide laser comprised of a gas-impermeable envelope, a pair of electrodes mounted within said envelope and facing one another, said electrodes including means for connection with a voltage source whereby one functions as a cathode and the other functions as an anode, a carbon-dioxide gas composition for producing laser radiation upon electrical discharge, said gas composition being sealed within said envelope, an oxygen-providing agent composed of nickel oxide positioned within said envelope, and a heating means positioned within said envelope and in such relation to said oxygen-providing agent as to maintain said agent at a temperature of at least 100° C. during operation.

2. A carbon-dioxide laser as defined in claim 1 wherein the oxygen-providing agent is arranged in close working proximity to one of the electrodes.

3. A carbon-dioxide laser as defined in claim 1 wherein an electrode of the laser is composed of nickel and the outer surface is provided with the oxygen-providing agent.

4. A carbon-dioxide laser as defined in claim 3 wherein the nickel electrode functions as a cathode.

5. A carbon-dioxide laser as defined in claim 1 including electrically insulated wires wound about an outer layer of the oxygen-providing agent and including means for connection with a voltage source to heat said agent during operation.

6. A carbon-dioxide laser as defined in claim 1 wherein the oxygen-providing agent comprises an outer layer of a mesh-like base, and said agent is positioned in close working proximity to an electrode of said laser.

7. A carbon-dioxide laser as defined in claim 1 wherein at least one of the electrodes of the laser is composed of nickel.

8. A carbon-dioxide laser comprised of a gas-impermeable envelope, a pair of electrodes mounted facing one another within said envelope, said electrodes including means for connection with a voltage source whereby one functions as a cathode and the other functions as an anode, a carbon-dioxide gas composition for producing laser radiation upon electrical discharge sealed within said envelope, and an oxygen-producing agent composed of nickel oxide arranged as an outer layer on at least one of the electrodes and positioned so as to attain a temperature in the range of about 400° to 500° C. during operation.

9. A carbon-dioxide laser as defined in claim 8 including a heating means positioned in contact with the oxygen-providing agent and being operationally connected to a voltage source so as to heat said agent.

10. A carbon-dioxide laser comprised of a gas-impermeable envelope, a pair of electrodes mounted facing one another within said envelope, said electrodes including means for connection with a voltage source whereby one functions as a cathode and the other functions as an anode, a carbon-dioxide gas composition for producing laser radiation upon electrical discharge sealed within said envelope, an oxygen-providing agent composed of nickel oxide coated on the surface of a base, said base being positioned in close working proximity to at least one of said electrodes, and a heating means positioned in contact with said oxygen-providing agent and including means for connection with a voltage source to heat said agent to a temperature in the range of about 400° to 500° C. during operation.

11. A carbon-dioxide laser as defined in claim 10 wherein the nickel oxide is coated on the surface of the base in a thickness of at least 1 millimicron.

* * * * *